W. D. Stroud.
Walking Planter.
No. 101,939. Patented Apr. 12, 1870.

Witnesses:
Henry T. Avery
Hugh R. Stockman

Inventor
W. D. Stroud
by Theodore Munger
his Attorney

United States Patent Office.

WILLIAM D. STROUD, OF OSHKOSH, WISCONSIN.

Letters Patent No. 101,939, dated April 12, 1870.

IMPROVEMENT IN SEED-PLANTER AND CULTIVATOR.

The Schedule referred to in these Letters Patent and making part of the same.

Be it known that I, WILLIAM D. STROUD, of Oshkosh, in the county of Winnebago and State of Wisconsin, have invented certain Improvements in Seed-Planters and Cultivators, of which the following is a specification.

Nature and Objects of the Invention.

The first part of my invention relates to the combination of a receiver, having a circular-shaped receptacle provided with a valve-seat, a cylinder with valve attached, an indicator, a stationary brush, a seed-conductor, a marker and coverer, a supporting and driving-wheel, a conical pulley, and a frame, arranged in such a manner that, when the conical pulley is connected by a belt with a pulley on the cylinder, and the invention is drawn or wheeled forward, the cylinder revolves, and causes the valve to open and close at regular intervals, the object of this part of my invention being to mark or furrow out the ground, drop the seed intermittingly or in hills, and to cover and pack the ground over it.

The second part of my invention relates to the combination of the seed-conductor, marker and coverer, supporting and driving-wheel, and frame, with a fast pulley, a loose pulley, a receiver having a circular-shaped bottom provided with a valve-seat, a gauge, and a cylinder provided with a plate and brushes, arranged in such a manner that, when a pulley on the cylinder is connected by a belt to the fast pulley, and the machine is drawn or moved forward, the cylinder revolves, and causes the brushes to act as valves, by which the seed is constantly supplied to the seed-conductor, the object of this part of my invention being to sow seed in drills when the ground is marked, the seed covered, and the ground packed over it, or, when the seed is covered, and the ground packed over it by the marker and coverer, which compose a part of the first part of my invention.

Figure 1:
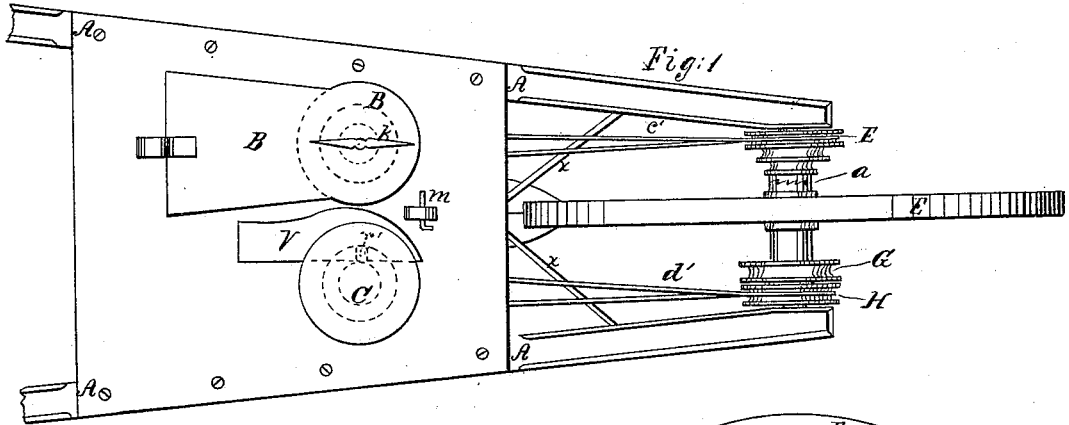
Figure 1 is a top view of the machine.
Figure 2:
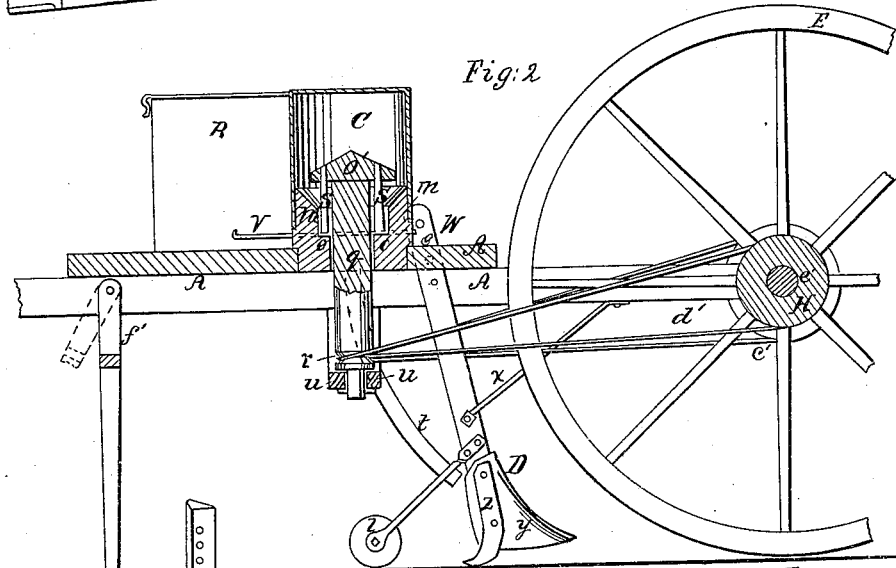
Figure 2 is a vertical section of that part of the machine used to sow the seed in drills.
Figure 5:
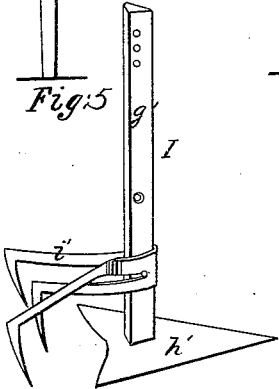
Figure 5 is a perspective view of the weed-cutter and rake.
Figure 3:
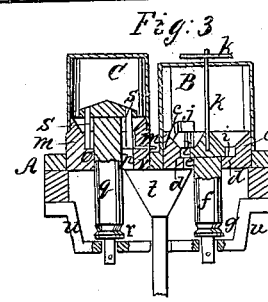
Figure 3 is a transverse section of the machine, cutting through the receivers.
Figure 4:
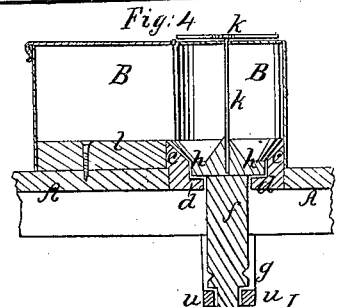
Figure 4 is a vertical section of that part of the machine used to sow the seed intermittingly.

General Description.

A is a frame.

B is a receiver, into which the seed is introduced when it is desired to plant intermittingly or in hills.

$c$ is the circular-shaped receptacle of the receiver B.

$d$ is the valve-seat, provided with the opening $e$.

$f$ is the cylinder, having the pulley or groove $g$ and the valve $h$, provided with a conical center and the cups $i$.

$j$ is a stationary brush, fastened in the beveled edge of the receptacle $c$, in such a manner as to cover the the cups $i$ whenever they are over the opening $e$ in the valve-seat $d$.

$k$ is an indicator, whose needle describes a line at right angles with a line drawn between the cups $i$.

$l$ is a piece used to place the bottom of the receiver B on a line with the edge of its receptacle $c$.

C is a receiver, into which the seed is introduced when it is desired to plant the seed in drills.

$m$ is the bottom of the receiver C.

$o$ is the valve-seat in the bottom $m$.

$p$ is the opening in the valve-seat $o$.

$q$ is the cylinder, having the pulley or grove $r$ and the plate $o'$ provided with brushes $s$. The brushes $s$ are placed so as to leave short spaces between them.

The bottom $m$ of the receiver C has beveled edges.

$t$ is a seed-conductor, arranged so as to receive seed from both receivers B and C.

The cross-bar $u$, in which the cylinders $f$ and $q$ have their bearings, also has a notch, in which the seed-conductor $t$ rests.

A gauge, $v$, for regulating the size of the opening $p$ in the valve-seat $o$, is inserted in the opening made for it in the bottom $m$ of receiver C. The gauge $v$ slides in between the opening $p$ and the brushes $s$.

A number of gauges, $v$, with different-sized holes, $r'$, are used to regulate the size of the opening $p$, to suit different-sized seed.

The shank of the marker and coverer D enters a mortise in the frame A, and is provided with holes for the reception of a pin, $w$, and a bolt, which fastens the rods $x$. The marker and coverer D is braced by the rods $x$, which are attached to it and the frame A.

$y$ is the tooth of the marker and coverer D.

$z$ are the wings which cover the seed, and $b$ is the spring-roller that packs the ground after it is covered over the seed.

E is the driving and supporting-wheel.

F is the conical pulley, with ratchet attachment $a$.

G is the loose pulley, and H is the fast pulley.

$c'$ and $d'$ are the belts or cords which connect the pulleys F, G, and H on the driving-shaft $e'$ with the pulleys or grooves $g$ and $r$ on the cylinders $f$ and $q$.

The shank $g'$, triangular-shaped plate $h'$, and rake $i'$ compose the weed-cutter I. The shank $g'$ is provided with holes corresponding to the holes in the shank of the marker and coverer D, so that the weed-cutter I can be substituted for the marker and coverer D.

The frame A has folding legs, $f'$.

Operation of the Invention.

When it is desired to use the machine for planting intermittingly or in hills, the belt $d'$ is placed on the loose pulley G, so that the cylinder $q$ will not be revolved. The belt $c'$ is placed on the conical pulley F, so as to regulate the distance between the hills. When the belt $c'$ is at the largest end of the conical pulley F, the distance between the hills will be shorter than when it is on a smaller part of the pulley. When the machine is moved forward the ratchet $a$ catches, and the pulley F is carried round with every revolution of the wheel E; this causes the cylinder $f$ to revolve, and open and close the valve $h$. The cups $i$, when they are not under the brush $j$, fill with the seed in the receiver B, and, when the cups $i$ come under the brush $j$, the seed is thrown by the brush $j$ through the opening $e$ into the seed-conductor $t$, through which it passes into the furrow marked by the tooth $y$, and is covered by the wings $z$, and the ground packed upon it by the spring-roller $b$.

The needle of the indicator $k$ describes a line at right angles with a line drawn between the cups $i$, so that, when the needle of the indicator points towards the ends of the machine, the valve $h$ is open, and the seed is dropped. At every revolution of the valve $h$ two hills of seed are planted. When the machine is moved backward the ratchet $a$ does not catch; consequently, the conical pulley F is not revolved.

When it is desired to sow the seed in drills the belt $d'$ is placed upon the fast pulley H, and the seed in the receiver C. A gauge, $v$, having the hole $r'$ of the desired size, is slid into its place in the bottom $m$ of the receiver C. The brushes $s$ keep the opening $p$ in the valve-seat $o$ closed when they are over it. The seed lies between the brushes $s$, and, whenever the space between the brushes $s$ is over the opening $p$, the seed flows into the conductor $t$; thence into the furrow marked by the tooth $y$, where it is covered by the wings $z$, and the ground is packed over it by the spring-roller $b$.

When it is desired to use the weed-cutter I, a bolt in the shank of the marker and coverer D, and the pin $iv$, must be removed, the marker and coverer D taken out, and the weed-cutter I substituted in its stead.

When the machine is used as a hand-planter, the ground must be first marked out by a marking-plow; but when used as a horse-planter, it performs the offices of marker, planter, and coverer.

Claims.

I claim as my invention—

1. The combination of the receiver B, cylinder $f$, provided with the valve $h$, brush $j$, seed-conductor $t$, marker and coverer D, rods $x$, belt $c'$, supporting and driving-wheel E, cross-bar $u$, conical pulley F, and frame A, substantially as and for the purpose hereinbefore specified.

2. The combination of the indicator $k$ with the cylinder $f$, provided with the valve $h$, substantially as and for the purposes hereinbefore specified.

3. The combination of the seed-conductor $t$, marker and coverer D, rods $x$, supporting and driving-wheel E, cross-bar $u$, and frame A, with the receiver C, gauge $v$, cylinder $q$, provided with the plate $o'$ and brushes $s$, belt $d'$, fast pulley H, and loose pulley G, substantially as and for the purposes hereinbefore specified.

W. D. STROUD.

Witnesses:
  W. G. RITCH,
  GEO. W. BURNELL.